United States Patent [19]

Henderson et al.

[11] 3,980,759

[45]*Sept. 14, 1976

[54] RECOVERY OF SULFUR DIOXIDE FROM GAS MIXTURES

[75] Inventors: James M. Henderson, New Brunswick, N.J.; William H. Wetherill, Staten Island, N.Y.

[73] Assignee: Asarco Incorporated, New York, N.Y.

[ * ] Notice: The portion of the term of this patent subsequent to May 25, 1993, has been disclaimed.

[22] Filed: Jan. 17, 1975

[21] Appl. No.: 541,835

Related U.S. Application Data

[63] Continuation-in-part of Ser. No. 446,081, Feb. 26, 1974.

[52] U.S. Cl............................. 423/539; 423/236; 423/243; 423/245
[51] Int. Cl.² ....................................... C01B 17/48
[58] Field of Search .......... 423/242, 243, 539, 541, 423/541 A, 545, 236, 245

[56] References Cited
UNITED STATES PATENTS

| | | |
|---|---|---|
| 1,972,074 | 9/1934 | Boswell .............................. 423/243 |
| 2,047,819 | 7/1936 | Boswell et al...................... 423/243 |
| 2,128,027 | 8/1938 | Clark .................................. 423/243 |
| 2,186,453 | 1/1940 | Gleason et al..................... 423/539 |
| 2,295,587 | 9/1942 | Fleming et al..................... 423/539 |
| 2,399,013 | 4/1946 | Fleming et al..................... 423/539 |
| 3,330,621 | 7/1967 | Uian-Ortuno et al.............. 423/242 |

FOREIGN PATENTS OR APPLICATIONS 669,966   9/1963   Canada........................... 423/541 A Primary Examiner—Oscar R. Vertiz
Assistant Examiner—Wayne A. Langel
Attorney, Agent, or Firm—R. J. Drew; E. J. Schaffer

[57] ABSTRACT

$SO_2$ is removed from a $SO_2$-containing gas mixture utilizing an aromatic amine as absorbent, followed by scrubbing the $SO_2$-depleted, aromatic amine-enriched effluent gas with sulfurous acid-and ammonium sulfate-containing aqueous solution to remove substantially all of the gaseous aromatic amine from the gas. The effluent gas is discharged ultimately to the atmosphere without any additional scrubbing of the gas, after its discharge from the sulfurous acid scrubbing zone, with sulfuric acid solution or any other acid solution or any acid.

27 Claims, 1 Drawing Figure

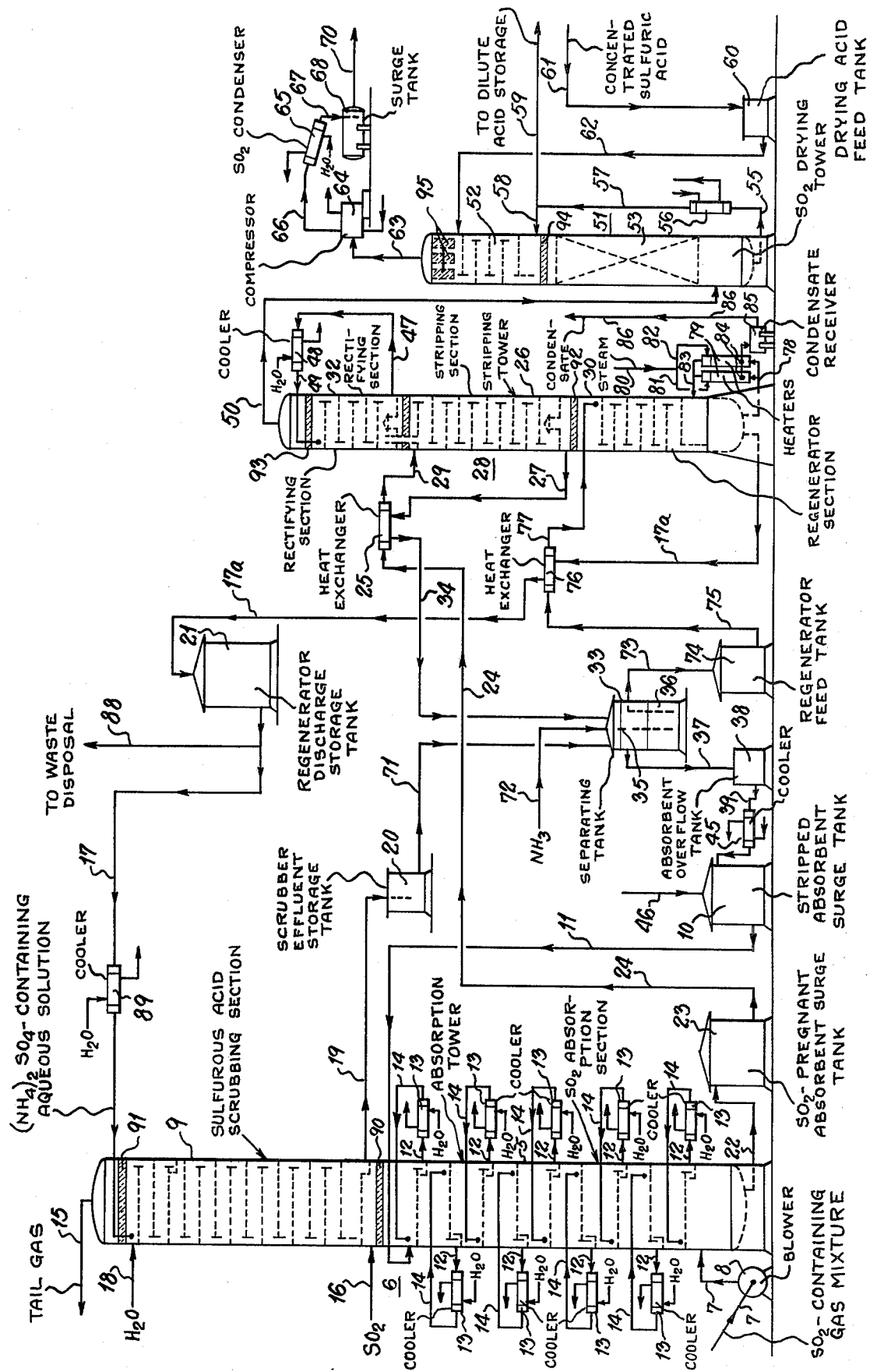

RECOVERY OF SULFUR DIOXIDE FROM GAS MIXTURES

CROSS REFERENCES TO RELATED APPLICATIONS

This is a continuation-in-part of our co-pending U.S. patent application Ser. No. 446,081, filed Feb. 26, 1974.

BACKGROUND OF THE INVENTION

1. Field of the Invention

This invention relates to the recovery of sulfur dioxide and more particularly to a new and improved process for recovering sulfur dioxide from gas mixtures containing sulfur dioxide.

2. Description of the Prior Art

Sulfur dioxide has been recovered from gas mixtures heretofore by intimately contacting the gas mixture in an absorber with an organic base, for example an aromatic amine, e.g. dimethyl aniline, as absorbent. The effluent gas containing gaseous aromatic amine from the absorbing step is then scrubbed with a soda solution in a soda scrubber to remove residual sulfur dioxide from the gas as sodium sulfite followed by scrubbing the gas with dilute sulfuric acid solution in a sulfuric acid scrubber to remove the aromatic amine from the gas mixture as the aromatic amine sulfate, e.g. dimethyl aniline sulfate. The sulfur dioxide is stripped from the absorbent, and the expelled sulfur dioxide is subsequently recovered in purified, anhydrous, liquefied state. The aqueous effluent solution from the soda scrubber containing sodium sulfite and sodium acid sulfite or sodium sulfite and sodium carbonate and the aqueous effluent solution from the sulfuric acid scrubber containing aromatic amine sulfate are combined in a collecting tank, wherein the aromatic amine per se is released from the aromatic amine sulfate and sodium sulfate is formed by reaction of the aromatic amine sulfate separately with the sodium sulfite and sodium acid sulfite or sodium sulfite and sodium carbonate present in the combined solutions. The combined liquid in the collecting tank is then passed to a separating tank wherein the released aromatic amine and an aqueous solution layer separate by gravity separation as separate liquid layers. The liquid aromatic amine is withdrawn from its separate layer in the separating tank and passed to the absorbent supply tank for re-use in the absorber for absorbing sulfur dioxide from the gas mixture. Aqueous solution is withdrawn from the aqueous solution layer in the separating tank and passed to the regenerator wherein aromatic amine is released from aromatic amine sulfite contained in the aqueous solution by heating, and steam is generated which is utilized for stripping the sulfur dioxide from the pregnant aromatic amine. Waste aqueous solution containing sodium sulfate is withdrawn from the bottom of the regenerator and consequently considerable quantities of this potentially polluting sodium sulfate-containing waste solution is required to be disposed of without causing undue pollution. As a modification of the aforementioned prior art process, the soda scrubber may be omitted and sodium sulfite or another compound, e.g. sodium carbonate, which will react with the aromatic amine sulfate to result in the release of the aromatic amine and the formation of sodium sulfate may be mixed with the aqueous solution from the sulfuric acid scrubber and a part or all of a water phase separated from the stripped aromatic amine absorbent. The released aromatic amine separates as a separate layer from an aqueous solution layer containing the sodium sulfate and aromatic amine sulfite as aforementioned, and the separated aqueous solution is passed to the regenerator as is hereinbefore described. Considerable quantities of waste aqueous solution containing sodium sulfate are also withdrawn from the bottom portion of the regenerator in this modification, and this considerable sodium sulfate-containing waste solution is also required to be disposed of without causing undue pollution. The aforementioned process and modification thereof are disclosed in U.S. Pat. No. 2,399,013, and although these processes do give good results in recovering sulfur dioxide from gas mixtures, the processes leave room for improvement. In the first place, the considerable quantities of waste aqueous solution containing sodium sulfate that are produced are a nuisance and require a considerable monetary expenditure to dispose of such waste solution without undue pollution. Furthermore, considerable amounts of sulfuric acid solution are required to be purchased at considerable expense for scrubbing the effluent gas to remove gaseous aromatic amine.

Other prior art processes for recovery of sulfur dioxide from gas mixtures and which result in the disadvantageous formation of considerable quantities of sodium sulfate-containing waste aqueous solution required to be disposed of, as well as employing sulfuric acid solution as sole scrubbing liquid for removing aromatic amine absorbent from the effluent gas from the $SO_2$ absorbing step are disclosed in U.S. Pat. Nos. 2,186,453 and 2,295,587.

It is also known in the prior art to use lime for treating the aqueous scrubbing solution from the sulfuric acid scrubber to release the organic base absorbent and to form calcium sulfate. The main problem with the lime treatment is that serious problems are encountered in handling the waste liquid containing the formed calcium sulfate, in that serious scale build up occurs in the process equipment, especially in the heat exchangers, due to the calcium sulfate. Because of this the use of lime for treating the aqueous acid scrubbing solution in the process is undesirable and disadvantageous. U.S. Pat. No. 2,128,027 discloses the use of lime or another calcium compound in the presence of $SO_2$ and a neutral sulfate, e.g. sodium sulfate, potassium sulfate or ammonium sulfate, for treating the aqueous solution, after separation from the organic base, to precipitate sulfate ions as calcium sulfate, and liberate organic base which immediately forms a soluble sulfite.

U.S. Pat. Nos. 1,972,074 and 2,047,819 disclose washing effluent gas from the $SO_2$-absorber tower with sulfuric acid, hydrochloric acid or sulfurous acid to remove organic base absorbent from the gas.

OBJECTS OF THE INVENTION

One object of the invention is to provide a new and improved process for the recovery of sulfur dioxide from gas mixtures.

Another object of the invention is to provide a process for the recovery of sulfur dioxide from gas mixtures wherein the volume of potentially polluting waste liquid sulfate solution to be disposed of is considerably reduced.

A further object is to provide a process for the recovery of sulfur dioxide from gas mixtures wherein the quantity of potentially polluting soluble inorganic salts that are disposed of in waste liquid streams in considerably reduced.

Another object is to provide a cyclic, regenerative process for the recovery of sulfur dioxide from gas mixtures which results in a considerable reduction in the monetary cost of elimination of alkali sulfate in potentially polluting waste aqueous sulfate-containing solutions obtained in the process, due to the considerable reduction in the volume of such potentially-polluting waste sulfate-containing solutions required to be disposed of and the considerable reduction of the quantity of alkali sulfate to be disposed of in such waste solutions.

An additional object is to provide a process for the recovery of sulfur dioxide from gas mixtures wherein the formation of sulfurous acid in the sulfurous acid scrubbing zone is enhanced due to the presence of ammonium sulfate contained in an aqueous ammonium sulfate-containing solution.

A further object is to provide a process for recovery of sulfur dioxide from gas mixtures without the problem of scale build-up in the process equipment, especially in the heat exchangers, used in the process due to the handling of sulfate-containing waste liquids or solutions from the regenerator.

A further object is to provide a process for the recovery of sulfur dioxide from gas mixtures wherein the amount of sulfuric acid scrubbing solution required for removal of gaseous organic base, e.g. aromatic amine, from an effluent gas that has previously been intimately contacted with the aromatic amine in a sulfur dioxide-absorbing step is considerably reduced.

Still another object is to provide a process for the recovery of sulfur dioxide from gas mixtures, wherein a major portion of the gaseous organic base absorbent introduced into the gas during the $SO_2$ absorbing step is removed from the gas by scrubbing with sulfurous acid solution obtained by dissolving sulfur dioxide gas readily available and obtained in the process in water, whereby the considerable expense of the sulfuric acid previously required to be purchased or otherwise obtained for the scrubbing removal of the gaseous organic base from the effluent gas from the first-mentioned sulfurous acid scrubbing is eliminated.

A further object is to provide a process for the recovery of sulfur dioxide from gas mixtures characterized by minimizing or eliminating pollution and by economy and efficiency.

BRIEF SUMMARY OF RELATED APPLICATION

U. S. patent application Ser. No. 446,081 of James M. Henderson and William H. Wetherill, filed Feb. 26, 1974, discloses and claims a new process for the recovery of sulfur dioxide from gas mixtures which is a considerable improvement over the prior art processes hereinbefore alluded to. The process of Ser. No. 446,081 comprises absorbing sulfur dioxide from the gas mixture containing the same by contacting the gas mixture in an absorption zone with a liquid water-insoluble organic base absorbent, for example water-insoluble aromatic amine absorbent, capable of liberating or releasing the sulfur dioxide gas upon subsequent treatment such as, for example, stripping with a gaseous stripping medium, or heating, or subjecting the $SO_2$-pregnant absorbent to reduced pressure. The sulfur dioxide-pregnant organic base absorbent withdrawn from the absorption zone is treated to cause the sulfur dioxide to be released from the liquid absorbent. The sulfur dioxide-impoverished, organic base-enriched effluent gas from the absorbing step or zone is scrubbed in a sulfurous acid scrubbing zone with a sulfurous acid-and ammonium sulfate-containing aqueous solution to remove a major portion, i.e. more than 50%, of the gaseous organic base absorbent from the gas. The sulfurous acid is provided in the sulfurous acid scrubbing zone by supplying a sulfur dioxide-containing gas into such scrubber zone, ordinarily into the lower portion of an upright scrubber zone, and separately supplying liquid aqueous solution containing ammonium sulfate into this scrubbing zone. The sulfur dioxide gas is dissolved in the water of the aqueous ammonium sulfate solution in this scrubbing zone to form the sulfurous acid-and ammonium sulfate-containing aqueous scrubber solution therein. The effluent gas containing a small amount of residual gaseous organic base absorbent from the last-mentioned scrubbing zone is scrubbed with dilute sulfuric acid solution in a sulfuric acid scrubbing zone to remove substantially all or a major portion, i.e. more than 50%, of the residual gaseous organic base absorbent from the gas. The sulfurous acid scrubbing solution containing organic base-sulfurous acid reaction product from the sulfurous acid scrubbing zone and the sulfuric acid scrubbing solution containing organic base-sulfuric acid reaction product from the sulfuric acid scrubbing zone are combined. Sulfur dioxide is stripped from the organic base absorbent in a stripping zone and the liberated sulfur dioxide is recovered. Ammonia is added to the combined scrubbing solutions in a separating zone, the ammonia addition resulting in the organic base being released from the organic base-sulfuric acid reaction product and the formation of ammonium sulfate in the separating zone. Liquid organic base is separated from an aqueous liquid phase in the separating zone, and the separated liquid organic base is withdrawn from the separating zone and returned ultimately to the sulfur dioxide-absorbing step.

BRIEF SUMMARY OF THE INVENTION

In accordance with the present invention, a still further improved process for the removal of sulfur dioxide from gas mixtures over the prior art processes hereinbefore referred to is attained, and which is a considerable improvement over such prior art processes, and which is also a considerable improvement over the process of our copending U.S. patent application Ser. No. 446,081. The process of the present invention comprises scrubbing the sulfur dioxide-impoverished effluent gas containing gaseous organic base absorbent from the sulfur dioxide absorption zone in a sulfurous acid-and ammonium sulfate-containing aqueous solution to remove a major portion, i.e. more than 50%, or substantially all, of the gaseous organic base absorbent from the gas. The sulfurous acid-and ammonium sulfate-containing aqueous solution is formed in such scrubbing zone by supplying sulfur dioxide-containing gas into this scrubbing zone which is in addition to sulfur dioxide contained in the sulfur dioxide-impoverished effluent gas passing into this scrubbing zone from the absorbing zone, and supplying at least a portion, ordinarily a major portion, i.e. more than 50%, of a liquid aqueous solution containing ammonium sulfate which is withdrawn from the absorbent regenerating zone to this scrubbing zone. The sulfur dioxide is dissolved in the water of the liquid aqueous ammonium sulfate-containing solution in this scrubbing zone to form the sulfurous acid-and ammonium sulfate-containing aqueous solution. The sulfur dioxide-impoverished, substantially organic base absorbent-free effluent or tail gas from the sulfurous acid scrubbing zone is discharged from the sulfurous acid scrubbing zone, without any additional scrubbing of this effluent gas after its discharge from this sulfurous acid scrubbing zone with sulfuric acid solution.

More specifically, the process comprises absorbing sulfur dioxide from the gas mixture containing same by contacting the gas mixture with a liquid water-insoluble organic base absorbent, for example water-insoluble aromatic amine absorbent, capable of liberating or releasing the sulfur dioxide gas upon subsequent treatment, such as, for example, stripping with a gaseous stripping medium, or heating, or subjecting the $SO_2$-pregnant absorbent to reduced pressure. The sulfur dioxide-impoverished, organic base-enriched effluent gas from the absorbing step or zone is scrubbed in a sulfurous acid scrubbing zone with the sulfurous acid- and ammonium sulfate-containing aqueous solution to remove a major portion, i.e. more than 50%, or substantially all, of the gaseous organic base absorbent from the gas. The sulfurous acid is provided in the sulfurous acid scrubbing zone by supplying a sulfur dioxide-containing gas into such scrubber zone, ordinarily into the lower portion of an upright scrubber zone, and separately supplying liquid aqueous solution containing ammonium sulfate into this scrubbing zone. The sulfur dioxide gas is dissolved in the water of the aqueous ammonium sulfate solution in this scrubbing zone to form the sulfurous acid-and ammonium sulfate-containing aqueous scrubber solution therein. Sulfur dioxide is stripped from the organic nitrogen base absorbent in a stripping zone and the liberated sulfur dioxide is recovered. The sulfurous acid scrubbing solution containing organic base-sulfurous acid reaction product is withdrawn from the sulfurous acid scrubbing zone and passed ultimately to a separating zone. Ammonia is added to the scrubbing solution in the separating zone, the ammonia addition resulting in the organic base being released from the organic base-sulfuric acid reaction product and the formation of ammonium sulfate in the separating zone. Liquid organic base is separated from an aqueous liquid phase in the separating zone, and the separated liquid organic base is withdrawn from the separating zone and returned ultimately to the sulfur dioxide-absorbing step. Separated aqueous liquid phase containing the ammonium sulfate and organic base-sulfurous acid reaction product is withdrawn from the separating zone and passed to a regenerator zone, wherein this aqueous liquid phase is heated to thermally decompose the organic base-sulfurous acid reaction product and liberate gaseous organic base and sulfur dioxide gas and generate considerable steam. The steam, gaseous organic base and sulfur dioxide gas are passed to the stripping zone wherein the steam serves as the main gaseous stripping medium for stripping the sulfur dioxide from the sulfur dioxide-pregnant organic base absorbent. Liquid aqueous solution containing ammonium sulfate is withdrawn from the regenerator zone and a major portion, i.e. in excess of 50%, or all or substantially all of this aqueous waste solution is passed for supply to the sulfurous acid scrubbing zone as previously disclosed herein.

A liquid organic base absorbent-water mixture, for example an aromatic amine-water mixture, is ordinarily passed from the stripping zone to the separating zone wherein the organic base absorbent is separated from the water.

That we were able to remove the gaseous aromatic amine, such as the dimethyl aniline, from the aromatic amine-enriched effluent gas from the $SO_2$ absorbing zone to the high level of removal that was attained, which amounted to a substantially complete removal of the dimethyl aniline from this gas, by scrubbing the effluent gas with only the sulfurous acid solution containing the ammonium sulfate and without any additional scrubbing of the effluent gas with sulfuric acid solution, was unexpected.

The process of this invention is especially meritoreous and a considerable improvement in this art by reasons of considerably reducing the amount of potentially polluting sulfate-containing solution from the regenerator that is discharged to waste, and also by eliminating the expense of sulfuric acid reagent previously required to be purchased for a sulfuric acid solution scrubber which previously followed the sulfurous acid scrubber. The amount of soluble sulfate salt in the waste aqueous solution stream from the regenerator required to be disposed of may be reduced by as much as 90% by virtue of this invention.

The soluble reaction product of the organic base, for example the aromatic amine, e.g. dimethyl aniline, with the sulfurous acid of the dilute sulfurous acid solution is referred to from time to time herein as the organic base sulfite or aromatic amine sulfite or dimethyl aniline sulfite respectively.

A major portion, i.e. more than 50% by volume, of the liquid aqueous ammonium sulfate-containing solution withdrawn from the regenerator zone is usually passed ultimately to the sulfurous acid scrubbing zone. A quantity in the range of about 60% to about 90% by volume of the withdrawn liquid aqueous ammonium sulfate-containing solution from the regenerator zone is ordinarily passed to the sulfurous acid scrubbing zone. All or substantially all of the withdrawn liquid aqueous ammonium sulfate solution from the regenerator zone can, for a short or limited time, be passed to this sulfurous acid scrubbing zone. A portion which is less than 50% by volume of the withdrawn liquid aqueous ammonium sulfate-containing solution can, if desired, be passed to the sulfurous acid scrubbing zone, but this is not preferred as it does not reduce the quantity of potentially polluting waste ammonium sulfate-containing solution to be disposed of to the extent that passing a major portion or more of such withdrawn liquid ammonium sulfate-containing solution to the sulfurous acid scrubbing zone does.

The passage of the ammonium sulfate aqueous solution from the regenerator zone to the sulfurous acid scrubbing zone, in addition to considerably reducing the amount of waste solution from the regenerator zone to be disposed of, is also a considerable improvement in that the presence of ammonium sulfate in this scrubbing zone considerably enhances the dissolution of the $SO_2$ gas in water to form sulfurous acid and also enhances the recovery of organic base, e.g. aromatic amine, in this sulfurous acid scrubbing zone. Thus the presence of the ammonium sulfate results in dissolution of greater quantities of $SO_2$ in water to form the sulfurous acid in this scrubbing zone than in the absence of the ammonium sulfate. Due to the formation of greater quantities of sulfurous acid solution in this scrubber zone, there is appreciably greater recovery of organic base, e.g. aromatic amine in this scrubbing zone.

The amount of ammonia added to the aqueous solution in the separator zone is an amount thereof sufficient to result in the liberation of the organic base, e.g. the aromatic amine, from organic base-sulfuric acid reaction product, e.g. the aromatic amine sulfate reaction product, also present in the aqueous solution therein and the formation of ammonium sulfate in the aqueous solution. The organic base-sulfuric acid reaction product, e.g. the aromatic amine sulfate, is present in the aqueous solution in the separator zone together with the organic base-sulfurous acid reaction product, e.g. the aromatic amine sulfite, due to oxidation of a certain amount of the organic base-sulfurous acid reaction product usually occurring in the sulfurous acid scrubbing zone, and also oxidation of a certain amount of the organic base-sulfurous acid reaction product usually occurring in the stripping and/or rectifying zones and passing to the separator zone from the stripping zone. The ammonia added to the aqueous solution in the separating zone is equivalent to the total content of sulfate radical, i.e. $SO_4$, present in the aromatic amine sulfate, e.g. dimethyl aniline sulfate, in the combined aqueous solutions therein. Although more than such equivalent amount of ammonia can be added to the aqueous solution in the separating zone, if desired, it is essential that the total amount of ammonia which is added to the aqueous solution in the separating zone be insufficient to result in the aqueous solution retaining a significant amount of sulfur dioxide in the regenerating zone due to the presence of excess ammonia.

Ammonia is usually utilized in the present invention as ammonia gas. However the ammonia can, if desired, be utilized in this invention when dissolved in water, i.e. as ammonium hydroxide.

Although the ammonia is ordinarily added to the aqueous solutions containing the organic base-sulfurous acid reaction product and the organic base-sulfuric acid reaction product in a single separating zone, the ammonia can, if desired, be added to such solutions in two or more separating zones.

When the ammonia is added to the aqueous solution containing the organic base-sulfurous acid reaction product, for example, the aromatic amine-sulfurous acid reaction product or aromatic amine sulfite, e.g. dimethyl aniline sulfite and the organic base-sulfuric acid reaction product, for example the aromatic amine-sulfuric acid reaction product or aromatic amine sulfate, e.g. dimethyl aniline sulfate, in two separating zones, the ammonia is added to such aqueous solution in the first separating zone in an amount which is sufficient to result in the release of the organic base, for example the aromatic amine, e.g. the dimethyl aniline, from a portion, ordinarily a major portion, i.e. more than 50%, of the organic base-sulfuric acid reaction product present therein and the formation of ammonium sulfate. The released or "sprung" liquid organic base separates as an upper layer superposed on a lower layer of aqueous solution containing the organic base-sulfurous acid reaction product, ammonium sulfate and residual organic base-sulfuric acid reaction product in the first stage separating zone, and the separated liquid organic base is withdrawn from the first stage separating zone and returned ultimately to the sulfur dioxide-absorbing step or zone. Liquid aqueous solution containing ammonium sulfate, the organic base-sulfurous acid reaction product and the residual organic base-sulfuric acid reaction product is withdrawn from the separated layer thereof in this first stage separating zone and passed into a second stage separating zone. Ammonia is added to the liquid aqueous solution in the second stage separating zone in an amount which is sufficient to result in the release of substantially all organic base from the residual organic base-sulfuric acid reaction product in the aqueous solution. The released or "sprung" organic base separates as an upper layer superposed on a lower layer of aqueous solution containing the ammonium sulfate and organic base-sulfurous acid reaction product in the second stage separating zone. The separated liquid organic base is withdrawn from this second stage separating zone and returned ultimately to the sulfur dioxide-absorbing step or stage. The liquid aqueous solution containing the ammonium sulfate and the organic base-sulfurous acid reaction product is withdrawn from this second stage separating zone and passed to the regenerator zone.

The sulfur dioxide-containing gas supplied into the sulfurous acid scrubbing zone, is ordinarily and preferably sulfur dioxide gas obtained from elsewhere in the process although it may be obtained from a source other than the process, and is in addition to the sulfur dioxide contained in the sulfur dioxide-impoverished effluent gas passing into this scrubber zone from the sulfur dioxide absorbing step. As exemplary, this sulfur dioxide-containing gas supplied into the sulfurous acid sulfate scrubbing zone can be pure or substantially pure $SO_2$ gas bled off the $SO_2$ gas line leading from the compressor for $SO_2$ and prior to the $SO_2$ condenser, or bled off a $SO_2$ gas line leading from the upper portion of the $SO_2$ drying tower, to the $SO_2$ compressor, pure or substantially pure $SO_2$ gas drawn off a top $SO_2$ gas-containing portion of a surge tank for liquefied $SO_2$, or pure or substantially pure $SO_2$ bled off the upper $SO_2$ gas-containing portion of a storage tank for liquid $SO_2$, or from a combination of any or all of these sources of $SO_2$ gas. Also as exemplary, this $SO_2$ gas supplied into the sulfurous acid scrubbing zone can be obtained as initially liquid $SO_2$ from a liquefied $SO_2$ surge supply tank or from a liquid $SO_2$ storage tank, and then gasified by passage through an expansion valve or valves or by other suitable means prior to being introduced into this scrubbing zone. The $SO_2$-containing gas supplied into the sulfurous acid scrubbing zone can, if desired, be impure $SO_2$-containing gas bled off the $SO_2$-containing gas mixture supply conduit leading from a blower to the inlet for the $SO_2$-containing gas mixture of the $SO_2$ absorber, although this source of the gas is not preferred.

The passage or supply of sulfur dioxide-containing gas into the sulfurous acid scrubbing zone, which is in addition to the $SO_2$ contained in $SO_2$-impoverished effluent gas passing into this scrubbing zone from the $SO_2$-absorbing zone, constitutes a considerable improvement over the utilization of only the $SO_2$ contained in the $SO_2$-impoverished effluent gas from the absorbing zone for forming the sulfurous acid in the sulfurous acid scrubbing zone. The reason for this is that it is difficult to control the $SO_2$ content of the $SO_2$-impoverished effluent gas from the $SO_2$ absorbing zone, and it is particularly difficult to control the $SO_2$ content of such effluent gas from the absorbing zone if the $SO_2$-containing gas feed stream to the absorber zone has a varying content of $SO_2$.

The sulfur dioxide-containing gas other than the $SO_2$ present in the effluent gas from the $SO_2$ absorbing zone is supplied into the sulfurous acid scrubbing zone in an amount sufficient to result in the formation of an amount of sulfurous acid in aqueous solution therein, due to dissolution of the $SO_2$ gas in and reaction with the water of the liquid aqueous ammonium sulfate solution and some water separately added as such to this scrubbing zone when this is done, which is sufficient to remove a significant portion, which is usually a major portion, i.e. more than 50%, or all or substantially all the organic base, e.g. aromatic amine, from the effluent gas passing into this scrubbing zone from the $SO_2$-absorbing zone. However the amount of sulfur dioxide-containing gas supplied into the sulfurous acid scrubbing zone should be insufficient to result in an excessive, air-polluting amount of sulfur dioxide gas, such as in excess of 0.10% of volume of $SO_2$, in the tail gas from this sulfurous acid scrubbing zone. The sulfur dioxide-containing gas, other than the $SO_2$ gas present in the effluent gas from the $SO_2$ absorbing step or zone, is usually fed into the sulfurous acid scrubbing zone in amount sufficient to result in the formation of an amount of sulfurous acid therein which is at least equivalent to the content of organic base, e.g. aromatic amine, in the effluent gas passing into this scrubbing zone from the sulfur dioxide absorbing zone. Again, the amount of sulfur dioxide-containing gas fed into the sulfurous acid scrubbing zone should be insufficient to result in an excessive, air-polluting amount of sulfur dioxide gas in the tail gas from this sulfurous acid scrubber zone.

Any organic base absorbent capable of absorbing sulfur dioxide gas from a gas mixture and which will readily release sulfur dioxide gas upon subsequent treatment, such as, for example, stripping with steam, heating, or subjecting the $SO_2$-pregnant absorbent to reduced pressure, is utilizable herein. The organic base absorbent herein is also characterized by being water-insoluble. By "water-insoluble" as used herein and in the appended claims in referring to the organic base is meant the organic base is either insoluble in water or only slightly soluble or of low solubility in water. Exemplary of the organic base absorbents are organic nitrogen-containing base absorbents, for example aromatic amines having the aforementioned capabilities and characteristic, e.g. dimethyl aniline, i.e. N, N-dimethyl aniline; and xylidine of commerce which is a mixture of isomers of xylidine. The xylidine is utilized herein when mixed with water, such xylidine-water mixture containing the xylidine and water in a volume ratio in the typical volume ratio range of 1:1 to 1:10 respectively. The dimethyl aniline is utilizable herein in anhydrous or substantially anhydrous state or as a dimethyl aniline-water mixture.

The sulfur dioxide-containing gas mixture which is treated by the process of this invention for the recovery of the sulfur dioxide is exemplified by sulfur dioxide-containing waste smelter gases, flue gases, and the like. The process herein may be employed for removal of sulfur dioxide from a gas mixture containing any concentration of the sulfur dioxide. However the process herein is especially suitable for removal of sulfur dioxide from a gas mixture containing a relatively small concentration of sulfur dioxide in the range of about 1% to about 10% by volume $SO_2$.

BRIEF DESCRIPTION OF THE DRAWING

The accompanying drawing is a flow sheet of a process of the invention and illustrating diagrammatically, a plant for its practise.

DETAILED DESCRIPTION OF THE DRAWING

With reference to the flow sheet of the drawing, a cool, clean gas mixture containing sulfur dioxide, e.g. a sulfur dioxide-containing gas from a copper smelter containing typically 6% by volume $SO_2$ (dry), is introduced at a temperature of typically 100°F. into the lower portion of absorber section 5 of absorption tower 6 through line 7 by means of blower 8. Tower 6, which also includes sulfurous acid scrubbing section 9, is, as shown, of the bubble plate type and is equipped with bubble cap trays. The sulfur dioxide-containing gas mixture passes upwardly within absorber section 5 in countercurrent flow to liquid organic base, for example an aromatic amine, e.g. dimethyl aniline, supplied to the upper portion of absorber section 5 at a temperature of typically 80°F. from absorbent surge supply tank 10 through line 11. The uprising sulfur dioxide-containing gas bubbles through a descending current of cool, anhydrous or substantially anhydrous, dimethyl aniline which flows downwardly from tray to tray in absorber 5, and consequently the sulfur dioxide is transferred from the gas mixture to the dimethyl aniline absorbent. Inasmuch as the absorption of the sulfide dioxide in the dimethyl aniline is exothermic and considerable heat is evolved during the absorption, the absorber section 5 is provided with cooling means in order to remove the reaction heat or heat of solution and thereby (1) increase the capacity of the dimethyl aniline absorbent to transfer sulfur dioxide, and (2) reduce the vapor pressure of the dimethyl aniline, thus saving reagents for the subsequent recovery of the dimethyl aniline absorbent. The dimethyl aniline absorbent at an elevated temperature is removed from each tray in the absorber 5 through conduit 12 and passed to cooler 13, cooled in each cooler 13 to a temperature of typically about 72°F. by indirect heat exchange with a cooling fluid, ordinarily water, and returned to the same tray via conduit 14. The absorber section 5 is thereby cooled and the temperature of the dimethyl aniline absorbent therein is maintained at typically about 75°F. in the upper portion of absorber section 5 to about 100°F. in the lower portion thereof.

The effluent gas from absorber section 5 is impoverished in sulfur dioxide and enriched in gaseous dimethyl aniline and passes upwardly through sulfurous acid scrubbing section 9 and leaves scrubbing section 9 through line 15 very low in sulfur dioxide content and free or substantially free of absorbent. In sulfurous acid scrubbing section 9, sulfur dioxide gas and liquid aqueous ammonium sulfate solution withdrawn from the bottom of the regenerator are separately fed into the lower and upper portion respectively of scrubber section 9 beneath the lowermost tray and above the uppermost tray respectively through lines 16 and 17 respectively. Liquid water per se may be supplied into the upper portion of the sulfurous acid-ammonium sulfate scrubbing section 9 through line 18 for the sulfurous acid production in the event additional water is needed to supplement the water introduced into this scrubbing section in the aqueous ammonium sulfate solution, and to maintain the water balance in the process. The uprising sulfur dioxide gas is dissolved in the water of the descending current of aqueous ammonium sulfate solution to form a dilute aqueous solution of sulfurous acid and ammonium sulfate which flows downwardly from tray to tray in scrubber section 9. The presence of the ammonium sulfate in sulfurous acid scrubbing section 9 results in a considerably enhanced dissolution of the $SO_2$ gas in the water to form sulfurous acid as is previously disclosed herein. Scrubbing section 9 is the sole acid scrubbing zone or section in which the effluent gas from the absorber section 5 is scrubbed for removal of the organic base absorbent, for example the aromatic amine, e.g. the dimethyl aniline, from the gas. The uprising effluent gas bubbles through the descending current of thus-formed dilute sulfurous acid-and ammonium sulfate-containing solution which flows downwardly from tray to tray in scrubber 9, and substantially all of the gaseous dimethyl aniline present in the gas is removed from the gas in scrubbing section 9, by reaction with the sulfurous acid in the presence of the ammonium sulfate to form dimethyl aniline sulfite. The liquid aqueous sulfurous acid-and ammonium sulfate-containing scrubbing solution also containing the thus-formed dimethyl aniline sulfite, and containing, in addition, a smaller amount of dimethyl aniline sulfate due to oxidation of the sulfite, is withdrawn from the lower portion of scrubbing section 9 through line 19 and passed to storage tank 20. The tail gas exiting from sulfurous acid scrubber 9 via line 15 usually contains less than 0.10% by volume sulfur dioxide.

The sulfur dioxide-pregnant dimethyl aniline is withdrawn from the lower portion of absorber section 5 below the lowermost tray therein and passed through conduit 22 at a temperature of typically about 100°F. and passed to surge tank 23. From surge tank 23, the sulfur dioxide-pregnant dimethyl aniline is passed through conduit 24 to heat exchanger 25 wherein it is preheated by indirect heat exchange with a liquid water-dimethyl aniline mixture supplied at an elevated temperature of typically 217°F. to heat exchanger 25 from the bottom portion of stripping section 26 via line 27, after which the sulfur dioxide-pregnant dimethyl aniline is introduced at an elevated temperature of typically 176°F. into the upper portion of stripping section 26 of tower 28 through line 29. Tower 28 is, as shown, of the bubble plate type and equipped with bubble cap trays. The descending pregnant liquid dimethyl aniline passes in intimate countercurrent contact in stripping section 26 with a considerable quantity of uprising steam and also with gaseous dimethyl aniline supplied from regenerator section 30 whereby the sulfur dioxide is stripped from the dimethyl aniline. The stripped or liberated sulfur dioxide gas passes upwardly together with a small amount of residual dimethyl aniline and also steam into rectifying section 32. Most of the steam is condensed in stripper 26 due to giving up its heat in stripping the sulfur dioxide from the dimethyl aniline. The stripped liquid dimethyl aniline and condensed steam, i.e. water, are withdrawn from the lower portion of stripping section 26 through line 27 and passed at an elevated temperature of typically 217°F. to heat exchanger 25 wherein the hot liquid dimethyl anilinewater mixture preheats the pregnant dimethyl aniline feed to the stripper by indirect heat exchange, and is cooled in so doing. The liquid dimethyl aniline-water mixture is then passed to separating tank 33 through line 34 wherein it stratifies or separates by gravity separation into an upper layer 35 of liquid dimethyl aniline and a lower liquid water or aqueous layer 36. Liquid anhydrous or substantially anhydrous dimethyl aniline is withdrawn from the upper layer of separated dimethyl aniline in separating tank 33 through line 37 and passed via line 37, collection tank 38, and line 39 to stripped dimethyl aniline supply surge tank 10 where it is ready for use in another cycle. Prior to being introduced into tank 10 the dimethyl aniline at an elevated temperature of typically 126°F. is indirectly cooled in cooler 45 with a suitable cooling fluid, for instance cooling water. Liquid anhydrous or substantially anhydrous dimethyl aniline is added as make up to surge supply tank 10 through line 46.

All or substantially all of the residual gaseous dimethyl aniline is removed from the uprising gaseous mixture comprising gaseous dimethyl aniline, sulfur dioxide gas and steam in rectifying section 32 by absorption in downwardly flowing quite concentrated aqueous sulfurous acid solution, the sulfurous acid solution being formed in rectifying section 32 due to the condensation of most if not all of the steam and the dissolution of a small amount of the sulfur dioxide gas in the resulting liquid water. The gaseous dimethyl aniline reacts with the sulfurous acid of the dilute liquid aqueous sulfurous acid solution in rectifying section 32 to form dimethyl aniline sulfite. Liquid aqueous solution containing sulfurous acid and dimethyl aniline sulfite is withdrawn at an elevated temperature of typically 155°F. from a lower portion of rectifying section 32 through line 47 and, after being indirectly cooled in cooler 48 with a cooling fluid, ordinarily water, is recycled and introduced into the upper portion of rectifying section 32 through line 49.

Sulfur dioxide gas is withdrawn from the top portion of rectifying section 32 through line 50 and introduced into the lower portion of two stage drying tower 51. The upper or second drying stage 52 of tower 51 is, as shown, of the bubble plate type and equipped with bubble cap trays. The lower or first drying stage 53 of tower 51 is, as shown, packed with suitable gas-liquid contact material which were Berl saddles. The water-containing sulfur dioxide gas passes upwardly in packed first drying stage 53 packed with Berl saddles in intimate contact with a moderate strength liquid sulfuric acid solution, typically sulfuric acid solution of 75% sulfuric acid concentration as supplied to the first drying stage 53, whereby most of the water vapor is removed from the gas. From first stage 53 the sulfur dioxide gas containing a small amount of residual water vapor passes upwardly into second drying stage 52 equipped with bubble cap trays wherein the uprising gas passes in intimate countercurrent contact with liquid concentrated sulfuric acid, typically sulfuric acid of 98% sulfuric acid concentration as supplied to the second drying stage 52, whereby all or substantially all of the water vapor is removed from the gas. Dilute sulfuric acid solution at an elevated temperature is withdrawn from the bottom portion of tower 51 through line 55 and, after being indirectly cooled in cooler 56 with a suitable cooling fluid, ordinarily cooling water, is recycled and introduced into the upper portion of first drying stage 53 through lines 57 and 58. A portion of this dilute sulfuric acid solution is withdrawn through line 59 from that being recycled to first drying stage 53 and passed to dilute acid storage. Concentrated liquid sulfuric acid is supplied from a suitable source of the concentrated acid, for instance a sulfuric acid plant, to feed tank 60 through line 61, and from tank 60 the concentrated liquid acid is passed into the upper portion of second drying stage 52 in tower 51 through line 62.

The dry $SO_2$ gas is withdrawn from the top portion of tower 51 through line 63 and, after being compressed in compressor 64, is passed to condenser 65 through line 66. The compressed sulfur dioxide at an elevated temperature is cooled to a sufficiently low temperature in condenser 65, by indirect cooling with a suitable cooling fluid, ordinarily cooling water, to liquefy the sulfur dioxide gas. The liquefied sulfur dioxide is passed from condenser 65 through line 67 to surge tank 68. From surge tank 68, the liquefied $SO_2$ is passed through line 70 to liquid $SO_2$ storage.

Liquid aqueous solution containing dimethyl aniline sulfite and usually also some dimethyl aniline sulfate and sulfurous acid is withdrawn from the lower portion of scrubber section 9 through line 19 and passed through line 19 to storage or collection tank 20. Aqueous solution containing dimethyl aniline sulfite, dimethyl aniline sulfate, and sulfurous acid is withdrawn from collection tank 20 and passed into separating tank 33 through line 71.

Ammonia gas is supplied into separating tank 33, which is a closed tank, through line 72 while avoiding supply of any calcium compound into tank 33 or anywhere else in the system, except for any calcium compound that may be supplied as an impurity in the water utilized in the process. The ammonia gas is bubbled as sole added treating agent beneath the surface of the lower layer 36 of aqueous liquid solution in separator 33. The quantity of ammonia introduced into separator 33 is an amount sufficient to react with all of the dimethyl aniline sulfate in separator 33 to release dimethyl aniline and form ammonium sulfate therein. The liberated dimethyl aniline passes by gravity separation to the upper layer 35 in separator 33 from where anhydrous or substantially anhydrous dimethyl-aniline is withdrawn through line 37 and ultimately returned to the sulfur dioxide-absorbing step in absorber section 5 of tower 6 as is previously disclosed herein. Aqueous liquid containing dimethyl aniline sulfite, ammonium sulfate and usually also a small amount of residual dimethyl aniline sulfate is withdrawn from lower aqueous layer 36 in separating tank 33 through line 73, and passed to aqueous solution collecting tank 74. Such liquid aqueous solution is withdrawn from tank 74 through line 75 and, after being preheated in heat exchanger 76 by indirect heat exchange with ammonium sulfate-containing aqueous solution at elevated temperature of typically 221°F. being passed to scrubbing section 9 of tower 6 through lines 17a and 17, is passed via line 77 and introduced into the upper portion of regenerator section 30 of tower 28 above the uppermost tray therein. This liquid aqueous solution is heated to its boiling point at the prevailing pressure by being withdrawn from the lower portion of regenerator section 30 through line 78 and passed to regenerator heaters 79, wherein the solution is heated by indirect heat exchange with steam or other suitable heating fluid introduced through lines 80, 81 and 82, after which it is re-introduced into the lower portion of regenerator section 30 below the lowermost tray therein through line 83. Due to the solution having been heated to its boiling point at the prevailing pressure in heaters 79, steam is generated which in turn effects the decomposition of dimethyl aniline sulfate in regenerator section 30 to liberate gaseous dimethyl aniline and sulfur dioxide gas, and a considerable quantity of process steam is generated. The resulting gaseous dimethyl aniline, sulfur dioxide gas and steam pass upwardly in regenerator section 30 and into stripping section 26 wherein the steam and gaseous dimethyl aniline pass into direct contact with the pregnant liquid dimethyl aniline to strip sulfur dioxide from the dimethyl aniline. Cooled and condensed steam is withdrawn from the lower portion of heaters 70 through line 84 and passed to condensate receiver tank 85 wherein the water condensate is collected, the water condensate being withdrawn from receiver 85 and returned for steam generation or other use through line 86.

Liquid aqueous solution containing ammonium sulfate is withdrawn at elevated temperature of typically 221°F. from the lower portion of regenerator section 30 through line 17a and, after being used to preheat liquid aqueous solution containing dimethyl aniline sulfite and ammonium sulfate flowing in line 75 by indirect heat exchange in heat exchanger 76, whereby this ammonium sulfate-containing aqueous solution is cooled, is passed without any treatment thereof except for cooling into storage tank 21. The ammonium sulfate-containing aqueous solution is withdrawn from tank 21 through line 17 and passed into the upper portion of sulfurous acid scrubbing section 9 through line 17. A minor portion or small amount of liquid aqueous solution containing ammonium sulfate is bled off the main stream thereof through line 88 and passed to waste disposal. The ammonium sulfate-containing aqueous solution is cooled indirectly in cooler 89 with a suitable cooling fluid, usually water, prior to being introduced into scrubbing section 9.

The absorption tower 6, as shown, consists of a single bubble-plate column which is divided into two separate units or sections. The $SO_2$-absorber section 5, which is the bottom section, consists of nine bubble cap trays as shown. The sulfurous acid scrubbing section 9, located directly above absorber section 5, consists of fifteen bubble cap trays as shown. Each of the two sections in absorption tower 6 is separate and distinct in operation and is provided with independent inlets and outlets for the liquid flow. The stripping tower 28, as shown, also consists of a single bubble plate tower and is divided into three units or sections. The regenerator section 30, which is the bottom section, consists of seven bubble cap trays as shown. The stripping section 26, which is located directly above the regenerator section, consists of eleven-bubble cap trays as shown. The rectifying section 32, which is the top section and located directly above the stripping section, consists of six bubble cap trays as shown. The drying tower 51, as shown, also consists of a single tower which is divided into two sections or stages. The first drying section or stage 53, which is the bottom section, is packed with a suitable gas-liquid contact material which was Berl saddles. The second drying section or stage 52 located directly above first drying stage 53, consists of five bubble cap trays as shown. Mist eliminators 90 and 91 are provided in tower 6, mist eliminators 92 and 93 in tower 26, and mist eliminators 94 and 95 in tower 51.

The improvements and advantages of this invention can be attained, at least in part, in processes varying in certain respects from the flow sheet shown in the accompanying drawing. Thus, the $SO_2$ absorber section 5 and sulfurous acid scrubbing section 9 of tower 6 can be separate columns or towers. And the sections themselves could be divided into separate sections. We have obtained excellent results in practicing the present invention when the sulfurous acid scrubbing section of tower 6 was divided into two separate scrubbing sections, one scrubbing section having five bubble cap trays and the other scrubbing section having ten bubble cap trays. The regenerator section 30 of tower 28 can also be a separate column or tower and the stripping section and rectifying section of tower 28 a separate column or tower. Moreover the two drying stages 53 and 52 of $SO_2$ drying tower 51 can be separate columns or towers.

Any suitable gas-liquid contacting means or material can be utilized in towers 6, 28 and 51 of the process of the flow sheet of the accompanying drawing. The bubble cap trays utilized in $SO_2$ absorption section 5 and sulfurous acid scrubbing section 9 of tower 6, in regenerator, stripping and rectifier sections 30, 26 and 32 respectively of tower 28, and drying stage 52 of tower 51 and the Berl saddles utilized in drying stage 53 of tower 51 are preferred for the gas-liquid contacting, but valve trays, Raschig rings, Intalox saddles or other suitable gas-liquid contact means are utilizable.

It will be understood that the system shown in the flow sheet of the accompanying drawing is provided with the required pumps, valves, meters, etc., which are not shown for the purpose of clarity.

DESCRIPTION OF THE PREFERRED EMBODIMENTS

Preferably a major portion in the range of about 65% to about 90% by volume of the liquid aqueous ammonium sulfate-containing solution withdrawn from the regenerator zone, is passed to the sulfurous acid scrubbing zone.

The total amount of ammonia added to the combined aqueous solutions in the separator zone or separator zones for releasing the organic base, e.g. the aromatic amine from the organic base sulfate, e.g. aromatic amine sulfate, is preferably an amount thereof which will result in the waste liquid aqueous solution at the lower portion of the regenerator zone and which is withdrawn from the lower portion of the regenerator zone having a pH of 5 to 6, more preferably 5.5 to 6.

The ammonia is preferably added to the combined aqueous solutions or solution containing the organic base-sulfurous acid reaction product and the organic base sulfuric acid reaction product in the separating zone or zones as ammonia gas.

Preferably the ammonia is added to the combined aqueous solutions containing the organic base-sulfurous acid reaction product and the organic base-sulfuric acid reaction product in one separating tank or stage.

The $SO_2$-containing gas which is supplied into the sulfurous acid scrubbing zone, and which is in addition to the $SO_2$ contained in $SO_2$-impoverished effluent gas passing into such scrubbing zone from the $SO_2$ absorbing zone, is preferably a pure or substantially pure $SO_2$ gas obtained elsewhere in the process.

The preferred organic base absorbent is the aromatic amines. Preferred among the aromatic amines are dimethyl aniline, i.e. N, N-dimethyl aniline, and a xylidine-water mixture containing the xylidine and water in a volume ratio in the volume ratio range of 1:5 to 1:10 respectively. The dimethyl aniline is preferred for removal of $SO_2$ from a high strength $SO_2$-containing gas mixture containing in excess of 3% to up to about 10% $SO_2$ by volume. The xylidine-water mixture is preferred for removal of $SO_2$ from a lower or weaker strength $SO_2$-containing gas mixture containing about 1% to 3% $SO_2$ by volume.

Preferably the organic base absorbent liquid is withdrawn from each bubble tray in the upright or vertically elongated absorber zone or section of the tower or column, followed by cooling this withdrawn absorbent liquid. The cooled absorbent liquid is then returned to the same bubble tray in the absorber zone.

The sulfur dioxide-containing gas which is supplied into the sulfurous acid upright or vertically elongated scrubbing section of the absorption tower, and which is in addition to the sulfur dioxide gas contained in sulfur dioxide-impoverished effluent gas passing into such scrubbing zone from the $SO_2$-absorbing zone, is preferably introduced into a lower portion of such scrubbing zone and most preferably beneath the lowermost tray or other gas-liquid contact means therein. Such sulfur dioxide-containing gas, which is preferably pure or substantially pure $SO_2$ gas obtained elsewhere in the process, is dissolved in water of the liquid aqueous ammonium sulfate-containing solution in this scrubbing zone to form dilute sulfurous acid aqueous solution. The liquid aqueous ammonium sulfate-containing solution, which is being passed from the regenerator zone, is preferably introduced into the upper portion of this sulfurous acid scrubbing zone above the uppermost tray or other gas-liquid contact means therein.

The process herein is preferably a continuous process.

The invention is further illustrated by the following example.

EXAMPLE

A cooled and clean gas mixture containing 6.0% by volume $SO_2$ (dry) and obtained from a copper smelter is introduced at a temperature of 85°F. – 100°F. and a volumetric feed rate of 32,500 SCFM (dry) through line 7 into absorber section 5 of absorption tower 6 below the lowermost tray therein by means of blower 8. Anhydrous liquid dimethyl aniline is pumped into the upper portion of absorber section 5 of tower 6 above the uppermost tray therein at a flow rate of 250 g.p.m. and a temperature of 80°F. – 100°F. from absorber surge supply tank 10 through line 11. The liquid dimethyl aniline absorbent passing downwardly in absorber section 5 is cooled indirectly by means of coolers 13 supplied with cooling water, and the dimethyl aniline absorbent is maintained at a temperature of about 75°F. at the top tray to about 100°F. at the bottom tray in absorber section 5. Sulfur dioxide-pregnant liquid dimethyl aniline absorbent is withdrawn at a temperature of about 90°F. – 175°F. from absorber section 5 through line 22 and pumped at a flow rate of 269 g.p.m. and at flow rates of $SO_2$, $SO_4$ and dimethyl aniline contained therein of 343.3 lbs/minute, 2.1 lbs/minute and 1946.4 lbs/minute respectively to surge tank 23. From surge tank 23 the pregnant liquid dimethyl aniline is pumped through line 24 to heat exchanger 25 wherein it is preheated by indirect heat exchange with a liquid water-dimethyl aniline mixture supplied at elevated temperature of typically 217°F. to heat exchanger 25 from stripping section 26 of tower 28 via line 27. The pregnant liquid dimethyl aniline is passed from heat exchanger 25 at a temperature of 175°F. through line 29 and introduced into stripping section 26 of tower 28. Sulfur dioxide is stripped from the pregnant liquid dimethyl aniline in stripping section 26 and the liberated sulfur dioxide gas passes upwardly into rectifying section 32. Stripped liquid dimethyl aniline and water (resulting from the cooling condensation of the steam in stripping the sulfur dioxide from the pregnant dimethyl aniline) are withdrawn from the lower portion of stripping section 26 below the lowermost tray therein through line 27 and passed at a temperature of 217°F. and a flow rate of 276 g.p.m. to heat exchanger 25. The hot liquid dimethyl aniline-water mixture preheats the pregnant dimethyl aniline feed to the stripping section 26 in heat exchanger 25 by indirect heat exchange as aforementioned, and is cooled in so doing. The liquid dimethyl aniline-water mixture is then passed at a temperature of 145°F. and a flow rate of 276 g.p.m. through line 34 to separating tank 33 wherein this liquid mixture is introduced beneath the surface of a lower aqueous layer therein. The liquid mixture separates by gravity separation in separating tank 33 into an upper layer 35 of liquid dimethyl aniline and a lower aqueous layer 36.

The $SO_2$-lean and dimethyl aniline-enriched effluent gas from absorber section 5 of tower 6 which contains about 0.15% by volume $SO_2$ and about 800–900 p.p.m. of gaseous dimethyl aniline, passes upwardly through sulfurous acid scrubbing section 9. A tail gas containing 0.05% by volume $SO_2$ and substantially-free of gaseous dimethyl aniline is withdrawn from sulfurous acid scrubbing section 9 through line 15. Substantially pure $SO_2$ gas bled off the upper $SO_2$ gas-containing space in liquefied $SO_2$ surge tank 69 and aqueous ammonium sulfate solution withdrawn from the lower portion of regenerator section 30 of tower 28 are separately supplied into scrubbing section 9 through lines 16 and 17 respectively. The $SO_2$ gas is supplied into the lower portion of scrubber section 9 below the lowermost tray therein through line 16 at a flow rate of 30 SCFM (dry) and at a temperature of 80°F. The liquid aqueous ammonium sulfate solution is pumped into the upper portion of scrubbing section 9 above the uppermost tray therein through line 20 at a temperature of 78°F. and a flow rate of 30 g.p.m. and at flow rates of ammonium sulfate and water contained therein of about 14 lbs/minute and about 250 lbs/minute respectively. The uprising $SO_2$ gas in scrubbing section 9 is dissolved in and reacts with the water of the downwardly flowing aqueous ammonium sulfate to form in scrubbing section 9 a dilute sulfurous acid-and ammonium sulfate-containing aqueous solution. Substantially all of the gaseous dimethyl aniline present in the gas is removed from the gas in scrubbing section 9 by reaction with the sulfurous acid in the presence of the ammonium sulfate to form dimethyl aniline sulfite. The aqueous sulfurous acid-and ammonium sulfate-containing scrubbing solution also containing the thus-formed dimethyl aniline sulfite is withdrawn from the lowermost tray in scrubber section 9 through line 19 at a temperature of 80°F. and passed at a flow rate of 34.5 g.p.m. and at flow rates of $SO_2$, $SO_4$ and dimethyl aniline contained therein of 6.8 lbs/minute, 11.0 lbs/minute and 10.5 lbs/minute respectively to collection tank 20.

A gaseous mixture of gaseous dimethyl aniline, $SO_2$ gas and steam leaves stripping section 26 of tower 28 and enters and passes upwardly within rectifying section 32. Substantially all dimethyl aniline is removed from such gaseous mixture in rectifying section 32 by absorption in fairly concentrated aqueous sulfurous acid solution flowing downwardly in rectifying section 32. The sulfurous acid solution is formed in rectifying section 32 due to the dissolution of a minor portion of the $SO_2$ gas in liquid water resulting from condensation of all or virtually all of the steam. The gaseous dimethyl aniline reacts with the sulfurous acid in rectifying section 32 to form dimethyl aniline sulfite. Liquid aqueous solution containing sulfurous acid and dimethyl aniline sulfite is withdrawn from a lower portion of rectifying section 32 at an elevated temperature of 155°F. through line 47 and, after being indirectly cooled in cooler 48 with cooling water, is pumped at a temperature of 75°F. and a flow rate of 335 g.p.m. into the upper portion of rectifying section 32 above the uppermost tray therein through line 49.

$SO_2$ gas at a temperature of 80°F. and containing considerable water vapor is withdrawn from the top portion of tower 28 through line 50 at a flow rate of $SO_2$ and water of 348.0 lbs/minute and 3.5 lbs/minute respectively and passed into the lower portion of two stage drying tower 51. The water-containing gas passes serially upwardly in tower 51 in intimate countercurrent contact with moderate strength aqueous sulfuric acid solution in first packed drying stage 53, and then in intimate countercurrent contact with concentrated sulfuric acid in second drying stage 52 equipped with bubble cap trays. Moderate strength aqueous sulfuric acid solution of about 75% sulfuric acid concentration is supplied at an average temperature of 85°F. and a flow rate of 35 g.p.m. into the upper portion of first drying stage 53 through line 59, such sulfuric acid solution having been withdrawn from the bottom portion of tower 51 through line 55 at a temperature in the range of 85°F. to 100°F., pumped to cooler 56 and, after being indirectly cooled in cooler 56 with cooling water, returned to the upper portion of first drying stage 53 through lines 57 and 58 and introduced therein as is previously disclosed herein. Concentrated sulfuric acid of 98% concentration is pumped through line 62 into second drying stage 52 of tower 51 above the uppermost tray therein from acid feed tank 60. The concentrated acid is supplied to feed tank 60 through line 61 from an acid supply source. Substantially anhydrous $SO_2$ gas is withdrawn from the top portion of drying tower 51 through line 63 at a temperature of 85°F. and passed at a flow rate of 347.7 lbs/minute and under a pressure of 14.7 psia to compressor 64 wherein the $SO_2$ gas is compressed. The compressed $SO_2$ gas leaves the compressor 64 through line 67 at a temperature of 320°F. and under a pressure of 84.1 psia and is passed to condenser 68 wherein the $SO_2$ gas is cooled to a sufficiently low temperature to liquefy same. The liquefied $SO_2$ is passed from condenser 68 at a temperature of 100°F. and under a pressure of 84.1 psia to liquefied $SO_2$ surge tank 69. From surge tank 69 the liquid $SO_2$ is pumped to liquid $SO_2$ storage.

The combined liquid aqueous scrubbing solution containing dimethyl aniline sulfite, dimethyl aniline sulfate and sulfurous acid is withdrawn from collection tank 20 at a temperature of 80°F. and pumped through line 71 at a flow rate of 34.5 g.p.m. and at flow rate of $SO_2$, $SO_4$ and dimethyl aniline contained therein of 6.8 lbs/minute, 11.0 lbs/minute, and 10.5 lbs/minute respectively to first stage separating tank 33 and introduced beneath the surface of lower aqueous liquid layer 36 therein. $NH_3$ gas is supplied into separating tank 33 through line 72 at a volumetric flow rate of 16.5 SCFM (dry), and the $NH_3$ gas is introduced beneath the surface of the lower layer 36 of liquid aqueous solution in separating tank 33. The ammonia reacts with a major portion of the dimethyl aniline sulfate and water in separator 33 to liberate dimethyl aniline and to form ammonium sulfate. The liberated dimethyl aniline passes by gravity separation to the upper layer 35 of liquid dimethyl aniline in separating tank 33, from where anhydrous or substantially anhydrous dimethyl aniline is withdrawn through line 37 and passed at a temperature of 80°F. – 126°F. and a flow rate of 250 g.p.m. to tank 38. The anhydrous liquid dimethyl aniline at a temperature of 126°F. is pumped from tank 38 to cooler 45 and, after being indirectly cooled in cooler 45 with cooling water, is introduced at a temperature of 80°F. into surge supply tank 10 through line 97. The anhydrous liquid dimethyl aniline is pumped from surge tank 10 through line 11 into the upper portion of absorber section 5 of tower 6 as is hereinbefore disclosed. Aqueous liquid containing dimethyl aniline sulfite and ammonium sulfate is withdrawn from the lower aqueous layer 36 in separating tank 33 and passed at a temperature of 126°F.–188°F. and a flow rate of 62 g.p.m. and flow rates of $SO_2$, $SO_4$ and dimethyl aniline of 5 lbs/minute, 12.6 lbs/minute and 10.5 lbs/minute respectively through line 73 to regenerator feed tank 74. This liquid aqueous solution is withdrawn from tank 74 and pumped at a temperature of 126°F. to heat exchanger 76 wherein it is preheated by indirect heat exchange with ammonium sulfate-containing aqueous solution at elevated temperature of 221°F. being passed to scrubbing section 9 of tower 6 through line 17. The preheated liquid aqueous solution is pumped from heat exchanger 76 through line 77 and at a temperature of 188°F. into the upper portion of regenerator section 30 of tower 26 above the uppermost tray in regenerator section 30. The liquid aqueous solution is withdrawn from the lower portion of regenerator section 30 through line 78, and heated in regenerator heaters 79 by indirect heat exchange with steam, after which the heated aqueous solution is reintroduced into regenerator section 30 below the lowermost tray therein. Due to the aqueous solution having been heated to its boiling point at the prevailing pressure, the dimethyl aniline sulfite is decomposed to liberate gaseous dimethyl aniline and $SO_2$ gas, and a considerable quantity of steam is generated. The thus-obtained gaseous dimethyl aniline, $SO_2$ gas and steam pass upwardly in regenerator section 30 and into stripping section 26, wherein at least the steam is utilized as a stripping medium to strip sulfur dioxide from $SO_2$-pregnant dimethyl aniline absorbent as is previously disclosed herein.

Liquid aqueous solution containing ammonium sulfate is withdrawn from regenerator section 30 through line 17 at a temperature of 221°F. and a rate of 36 g.p.m. and, after being used to preheat liquid aqueous solution containing dimethyl aniline sulfite and ammonium sulfate flowing in line 75 by indirect heat exchanger in exchanger 76 and then cooled by indirect cooling with cooling water in cooler 89, is passed into sulfurous acid scrubbing section 9 above the uppermost tray therein as is previously disclosed herein. Prior to being cooled and introduced into scrubbing section 9, a small amount of the liquid aqueous ammonium sulfate-containing solution containing 60 g/l ammonium sulfate is bled off through line 88 at a bleed flow rate of 6 g.p.m. The remaining major or predominant portion of liquid aqueous ammonium sulfate-containing solution is pumped, after leaving cooler 89, through line 17 at a temperature of 78°F. and a flow rate of 30 g.p.m. and at flow rates of ammonium sulfate and water contained therein of 14.4 lbs/minute and 250.3 lbs/minute respectively and introduced into scrubbing section 9 of tower 6 as hereinbefore disclosed.

In the foregoing example the symbols "g.p.m." means gallons or gallon per minute, "psia" means pounds per square inch absolute, "p.p.m." means parts per million, "g/l" means grams per liter, and "SCFM" means standard cubic feet of gas per minute, which is the cubic feet of gas per minute at standard conditions of 0°C. and 760 mm. of Hg pressure. The temperatures and flow rates set forth in the foregoing example, except when temperature ranges are set forth, are average temperatures and average flow rates.

What is claimed is:

1. In a process for recovering sulfur dioxide from a gas mixture containing the same which comprises absorbing sulfur dioxide from the gas mixture by contacting the gas mixture in an absorption zone with a liquid, water-insoluble aromatic amine absorbent capable of releasing the sulfur dioxide upon subsequent treatment, scrubbing sulfur dioxide-impoverished effluent gas containing gaseous aromatic amine absorbent from said absorption zone with dilute sulfurous acid solution in a sulfurous acid scrubbing zone to remove aromatic amine absorbent from the gas, stripping sulfur dioxide from sulfur dioxide-pregnant aromatic amine absorbent in a stripping zone, and recovering the liberated sulfur dioxide from the stripping zone, the improvement which comprises having present in the sulfurous acid aqueous solution in the sulfurous acid scrubbing zone ammonium sulfate, the presence of the ammonium sulfate in the sulfurous acid-containing aqueous solution resulting in an appreciably greater recovery of the aromatic amine in said sulfurous acid scrubbing zone than in the absence of the ammonium sulfate, discharging the sulfur dioxide-impoverished, substantially aromatic amine absorbent-free effluent gas from the sulfurous acid scrubbing zone without any additional scrubbing of the discharged effluent gas with sulfuric acid solution, the sulfurous acid-and ammonium sulfate-containing aqueous solution being formed in the sulfurous acid scrubbing zone by supplying sulfur dioxide-containing gas into said sulfurous acid scrubbing zone, the sulfur dioxide-containing gas supplied into the sulfurous acid scrubbing zone being in addition to sulfur dioxide contained in sulfur dioxide-impoverished effluent gas passing into said sulfurous acid scrubbing zone from said absorption zone, supplying a liquid aqueous solution consisting essentially of dissolved ammonium sulfate from a regenerating zone into said sulfurous acid scrubbing zone, the sulfur dioxide being dissolved in the water of the liquid aqueous solution consisting essentially of ammonium sulfate to form the sulfurous acid-and ammonium sulfate-containing aqueous solution, withdrawing the scrubbing aqueous solution containing aromatic amine sulfite and aromatic amine sulfate from the sulfurous acid scrubbing zone, passing withdrawn scrubbing aqueous solution containing aromatic amine sulfite and aromatic amine sulfate to a separating zone, adding ammonia to the aqueous solution in the separating zone, the ammonia being added to the aqueous solution in the separating zone in amount sufficient to result in the release of the aromatic amine from the aromatic amine sulfate therein and formation of ammonium sulfate in said separating zone, separating the liquid aromatic amine from an aqueous liquid phase containing the ammonium sulfate and aromatic amine sulfite in said separating zone, withdrawing separated liquid aromatic amine from the separating zone and returning the withdrawn liquid aromatic amine ultimately to the sulfur dioxide absorbing step, withdrawing aqueous liquid phase containing the aromatic amine sulfite from said separating zone and passing the aqueous liquid phase to the regenerating zone, heating said aqueous liquid phase in the regenerating zone to decompose the aromatic amine sulfite and liberate gaseous aromatic amine and sulfur dioxide gas and generate steam, passing the gaseous aromatic amine, sulfur dioxide gas and steam into the stripping zone, and withdrawing a liquid aqueous solution consisting essentially of dissolved ammonium sulfate from the regenerating zone and passing more than 50% by volume of the withdrawn liquid aqueous solution consisting essentially of dissolved ammonium sulfate for supply into the sulfurous acid scrubbing zone as aforesaid, an appreciably greater recovery of aromatic amine being attained in the sulfurous acid scrubbing zone due to the presence of the ammonium sulfate in the sulfurous acid scrubbing zone.

2. The process of claim 1 wherein the sulfur dioxide other than the sulfur dioxide contained in the $SO_2$-impoverished effluent gas from the absorbing step is supplied into the sulfurous acid scrubber zone in amount sufficient to form an amount of sulfurous acid therein by dissolution in water which is at least equivalent to the content of aromatic amine in effluent gas passing into said scrubber zone from the sulfur dioxide absorbing step but which is insufficient to result in an amount of sulfur dioxide gas in escess of 0.10% by volume $SO_2$ in a tail gas from the sulfurous acid scrubbing zone.

3. The process of claim 2 wherein the sulfur dioxide-containing gas supplied into the sulfurous acid-scrubbing zone is substantially pure $SO_2$ gas obtained from elsewhere in the process.

4. The process of claim 3 wherein the substantially pure sulfur dioxide gas is obtained from product $SO_2$ storage.

5. The process of claim 3 wherein the substantially pure sulfuric dioxide gas is obtained from a top $SO_2$ gas-containing portion of a liquefied $SO_2$ surge tank.

6. The process of claim 2 wherein the sulfur dioxide gas is supplied into the sulfurous acid scrubber zone in amount sufficient to form an amount of sulfurous acid therein which is in excess of an amount thereof equivalent to the content of aromatic amine in the effluent gas passing into said scrubber zone from the sulfur dioxide absorbing step but which is insufficient to result in an amount of sulfur dioxide in excess of 0.10% by volume $SO_2$ in the tail gas from the sulfurous acid scrubbing zone.

7. The process of claim 1 wherein the ammonia is added to the aqueous solution in at least two separating zones, the ammonia being added to the liquid aqueous solution in a first stage separating zone in an amount sufficient to result in the release of the aromatic amine from a portion of the aromatic amine sulfate present therein and the formation of ammonium sulfate, separated liquid aromatic amine being withdrawn from the first stage separating zone and returned ultimately to the sulfur dioxide-absorbing step, liquid aqueous solution containing ammonium sulfate, the aromatic amine sulfite, and residual aromatic amine sulfate being withdrawn from a separated layer thereof in the first stage separating zone and passed into a second stage separating zone, the ammonia being added to the liquid aqueous solution in the second stage separating zone in an amount sufficient to result in the release of substantially all organic base from the residual aromatic amine sulfate in the aqueous solution, liberated liquid aromatic amine being separated from aqueous liquid solution in the second stage separator zone, the separated liquid aromatic amine being withdrawn from the second stage separating zone and returned ultimately to the sulfur dioxide-absorbing step, and separated aqueous liquid solution containing ammonium sulfate and aromatic amine sulfite being withdrawn from the second stage separating zone and passed to the regenerator zone.

8. The process of claim 7 wherein the ammonia is added as ammonia gas.

9. The process of claim 7 wherein the aromatic amine is dimethyl aniline.

10. The process of claim 7 wherein the ammonia is added to the aqueous solution in two separating zones.

11. The process of claim 1 wherein the amount of ammonia added to the aqueous solution in the separating zone is at least equivalent to the total content of sulfate radical present in aromatic amine sulfate contained in the aqueous solution.

12. The process of claim 11 wherein the amount of ammonia added to the aqueous solution in the separating zone is equivalent to the total content of sulfate radical present in aromatic amine sulfate contained in the aqueous solution.

13. The process of claim 11 wherein the ammonia is added as ammonia gas.

14. The process of claim 1 wherein a stripped liquid aromatic amine absorbent-water mixture is passed from the stripping zone to a separating zone for separation of the aromatic amine absorbent from the water.

15. The process of claim 14 wherein the stripped liquid aromatic amine absorbent-water mixture is withdrawn at elevated temperature from the stripping zone and, prior to being introduced into the separating zone, is passed in indirect heat exchange relationship with sulfur dioxide-pregnant aromatic amine absorbent being passed to the stripping zone thereby preheating the pregnant aromatic amine absorbent prior to its introduction into the stripping zone and cooling the stripped aromatic amine absorbent-water mixture prior to its introduction into the separating zone.

16. The process of claim 1 wherein the ammonia is added as ammonia gas.

17. The process of claim 1 wherein the aromatic amine is xylidine present in a xylidine-water mixture.

18. The process of claim 1 wherein the amount of ammonia added to the aqueous solution in the separating zone is sufficient to result in the liquid aqueous solution at a lower portion of the regenerating zone having a pH in the range of 5 to 6.

19. The process of claim 1 wherein about 65% to about 80% by volume of the withdrawn liquid aqueous ammonium sulfate-containing solution from the regenerating zone is passed to the sulfurous acid scrubbing zone.

20. The process of claim 1 wherein about 60% to about 90% by volume of the withdrawn liquid aqueous ammonium sulfate-containing solution from the regenerating zone is passed to the sulfurous acid scrubbing zone.

21. The process of claim 1 wherein liquid aromatic amine absorbent is withdrawn from each tray of an upright absorber zone provided with spaced-apart bubble cap trays, followed by cooling the withdrawn absorbent liquid and returning the cooled absorbent liquid to the same tray in said absorber zone.

22. The process of claim 1 wherein the aromatic amine is dimethyl aniline.

23. The process of claim 1 wherein the liquid aqueous ammonium sulfate-containing solution is withdrawn at elevated temperature from the regenerating zone and, prior to being passed to the sulfurous acid scrubbing zone, is passed in indirect heat exchange relationship with an aromatic amine sulfite-containing aqueous solution being passed to the regenerating zone to thereby preheat the last-mentioned aqueous solution prior to its introduction into the regenerating zone and to thereby cool the ammonium sulfate-containing solution prior to its introduction into the sulfurous acid scrubbing zone.

24. The process of claim 1 wherein the amount of ammonia added to the aqueous solution in the separating zone is sufficient to result in the liquid aqueous solution at a lower portion of the regenerating zone having a pH in the range of 5.5 to 6.

25. In a process for recovering sulfur dioxide from a gas mixture containing the same comprising absorbing sulfur dioxide from the gas mixture by contacting the gas mixture in an absorption zone with a liquid water-insoluble aromatic amine absorbent capable of releasing the sulfur dioxide upon subsequent treatment, treating sulfur dioxide-pregnant aromatic amine absorbent withdrawn from the absorption zone to cause the sulfur dioxide to be released from the liquid absorbent, and recovering the thus-released sulfur dioxide, the improvement which comprises scrubbing the sulfur dioxide-impoverished effluent gas which is enriched in gaseous aromatic amine absorbent from the sulfur dioxide absorption zone in a sulfurous acid scrubbing zone with sulfurous acid aqueous solution in the presence of ammonium sulfate also contained therein to remove substantially all aromatic amine absorbent from the gas, the sulfurous acid-and ammonium sulfate-containing aqueous solution being formed in the sulfurous acid scrubbing zone by supplying sulfur dioxide-containing gas into the scrubbing zone which is in addition to sulfur dioxide contained in the sulfur dioxide-impoverished effluent gas passing into the sulfurous acid scrubbing zone from the absorption zone, and supplying at least a portion of a liquid aqueous solution consisting essentially of ammonium sulfate withdrawn from an absorbent regenerating zone into said sulfurous acid scrubbing zone, the sulfur dioxide being dissolved in the water of the liquid aqueous ammonium sulfate-containing solution in the last-mentioned scrubbing zone to form the sulfurous acid-and ammonium-sulfate containing aqueous solution, and discharging the sulfur dioxide-impoverished, substantially aromatic amine absorbent-free effluent gas from the sulfurous acid scrubbing zone without any additional scrubbing of said effluent gas with sulfuric acid solution.

26. The process of claim 25 wherein more than 50% by volume of the liquid ammonium sulfate-containing aqueous solution withdrawn from the regenerating zone is supplied into the sulfurous acid scrubbing zone.

27. The process of claim 26 wherein the sulfur dioxide-containing gas is substantially pure $SO_2$ gas obtained elsewhere in the process and is supplied into a lower portion of an upright sulfurous acid scrubbing zone, and the liquid ammonium sulfate-containing aqueous solution is supplied into an upper portion of the last-mentioned scrubbing zone.

* * * * *

UNITED STATES PATENT OFFICE
CERTIFICATE OF CORRECTION

Patent No. 3,980,759  Dated September 14, 1976

Inventor(s) James M. Henderson et al.

It is certified that error appears in the above-identified patent and that said Letters Patent are hereby corrected as shown below:

Page 1, column 1, name of Assignee should read --ASARCO Incorporated-- instead of "Asarco Incorporated". Column 10, line 29, "sulfide" should read --sulfur--. Column 16, line 44, "absorber" should read --absorbent--. Column 21, line 32, "escess" should read --excess--; line 43, "sulfuric" should read --sulfur--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*